Patented Dec. 5, 1944

2,364,350

UNITED STATES PATENT OFFICE 2,364,350

PHOTOGRAPHIC DEVELOPER

Joseph B. Dickey and James G. McNally, Rochester, N. Y., assignors to Eastman Kodak Company, Rochester, N. Y., a corporation of New Jersey No Drawing. Application November 6, 1941, Serial No. 418,041

7 Claims. (Cl. 95—88)

This invention relates to amino compounds containing at least one furyl or tetrahydrofuryl group. More particularly, this invention relates to arylamines containing one or more furyl or tetrahydrofuryl groups which are useful for photogaphic purposes, and novel processes for making the aforesaid compounds.

This application is a continuation-in-part of our applications Ser. No. 269,218, filed April 21, 1939 (now U. S. Patent 2,273,564, dated February 17, 1942), Ser. No. 298,086, filed October 5, 1939 (now U. S. Patent 2,292,212, dated August 4, 1942) and Ser. No. 301,466, filed October 26, 1939 (now abandoned). While our amino compounds may be employed for a number of purposes industrially, we will describe their use in particular for photographic purposes. Although a number of compounds have been tested for photographic developers, many of the prior art compounds do not give very fine-grain development, or some of the compounds which do give fine-grain development, many exhibit adverse biological activity, or otherwise present disadvantages. It is, therefore, apparent that the development of new compounds and processes of producing the compounds which give improved results, as for example, fine-grain photographic development, is a highly desirable result.

This invention has for one object to provide new compounds containing at least one furyl group in the molecule. Still another object is to provide new compounds, containing furyl groups in the molecule, which are useful for photographic purposes. Still another object is to provide novel phenylenediamine compounds containing at least one furyl, tetrahydrofuryl, or the like group in the molecule which may be employed with various alkaline and other materials for photographic developing. Still another object is to provide novel compounds containing a furyl group in the molecule, which compounds are useful for fine-grain photographic development. Still another object is to provide various new chemical compounds useful as amines, or otherwise in the preparation of the foregoing. Still another object is to provide novel processes which may be employed for producing the aforementioned compounds. Other objects will appear hereinafter.

We have found that certain new arylamine compounds containing a group such as a tetrahydrofuryl group, or other furyl group, may be prepared, certain of the compounds being useful for photographic purposes, as for example, fine-grain development. Certain of our compounds may be exemplified by the following formula:

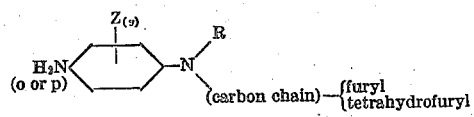

In regard to the furyl group, for convenience and brevity herein we employ this term to embrace the various forms alpha, beta, or tetrahydrofuryl alpha and beta and the like. The various forms which the furyl group may have are described in numerous texts in chemistry, hence, it is unnecessary to go into detail herein except to indicate that in general we prefer the group known as the α-tetrahydrofuryl group. However, generically, our invention embraces the other modifications, either the simple unhydrogenated furyl groups, the β-furyl groups, or combinations thereof. The member designated Z is a substituent such as amino, halogen, hydroxy, alkoxy, alkyl, and the like, as will be further apparent from the description which follows:

$y$ is an integer 4 or less. R is a member such as hydrogen, substituted or unsubstituted alkyl, alkylene, aryl, cyclic aryl, or heterocyclic. An example of a heterocyclic would be when R comprised—(carbon chain)—furyl. The carbon chain referred to usually comprises a simple alkylene linkage, as will be observed from the example which follows.

However, it will be noted that some of the hydrogens on the alkylene member may be substituted in various ways. For convenience and brevity, however, we refer to all of such groups as an alkylene group unless the context indicates otherwise.

We have found several novel methods by which our new compounds may be prepared. These methods are generically illustrated by the following formulations which will be explained in detail as the description proceeds.

I

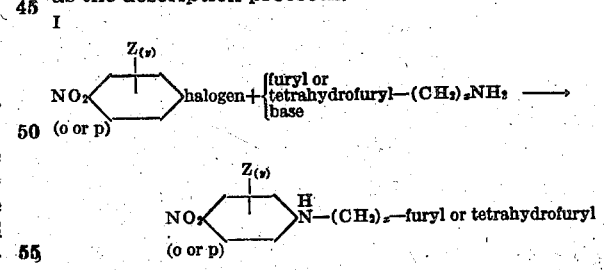

II 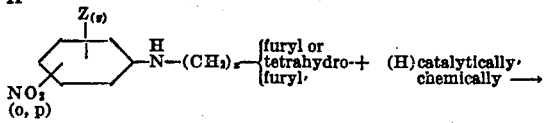

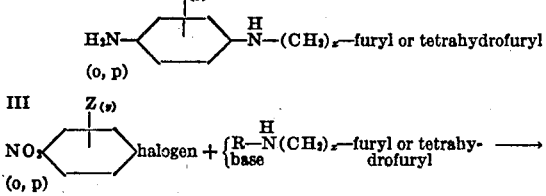

III 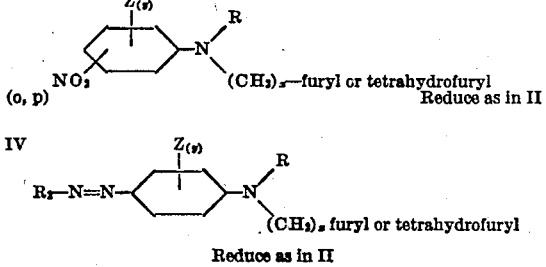

IV 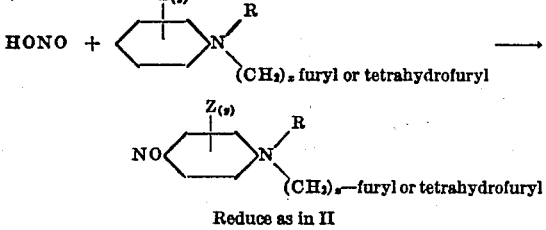

V 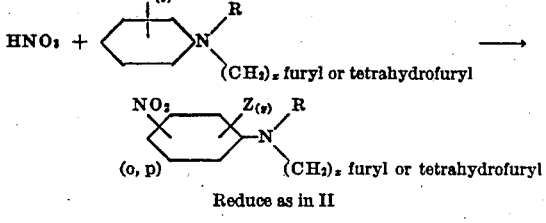

VI 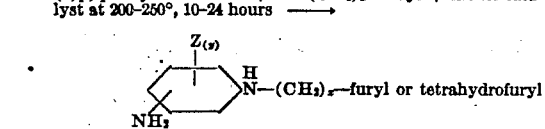

VII (o, p) phenylenediamine + HO(CH₂)$_x$—furyl + nickel catalyst at 200-250°, 10-24 hours ⟶

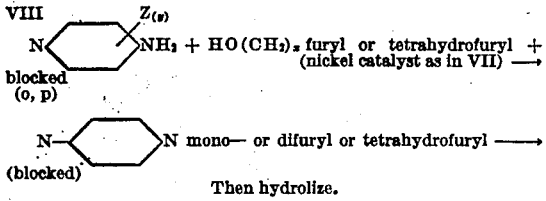

VIII 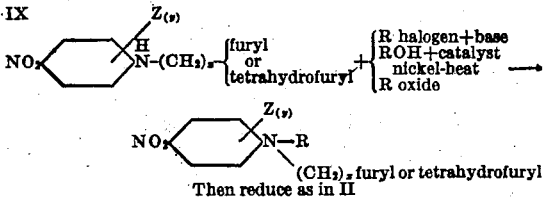

IX

NO$_2$—⟨⟩—N(CH$_2$)$_x$—{furyl or tetrahydrofuryl} + {R halogen+base, ROH+catalyst, nickel-heat, R oxide} ⟶

NO$_2$—⟨⟩—N—R
(CH$_2$)$_x$ furyl or tetrahydrofuryl
Then reduce as in II

Referring to the process I wherein a furylamine is employed, such an amine would preferably be prepared by reacting the corresponding hydroxy furfuryl compound with an amination agent such as ammonia in the presence of a catalyst. The formation of such furyl amines will be apparent from the following examples:

*Example 1*

202 gms. tetrahydrofurfuryl alcohol, 48 gms. ammonia as a 28% aqueous solution and 10 gms. nickel from an alloy are heated in an autoclave at 160° for 12 hours. The bomb is cooled, the contents are removed, and most of the water and ammonia are removed by distillation. The residue (brown color) is then made slightly acid to Congo with hydrochloric acid and the alcohol is removed under reduced pressure. The residue is then treated with a saturated aqueous solution of sodium hydroxide, extracted with ether, dried over potassium hydroxide and distilled. The tetrahydrofurfurylamine obtained is 12% of the theory based on the alcohol charged into the bomb. The amine boiled at 152–155°/760 mm. Exactly similar results are obtained using a catalyst such as that prepared from nickel nitrate through the hydroxide, to the oxide and then reduced. This material may be supported on pumice or similar material.

*Example 2*

202 gms. tetrahydrofurfuryl alcohol and 48 gms. ammonia as a 28% aqueous solution are heated in a shaking autoclave at 190° for 18 hours and the reaction product is worked up as described in Example 1. There is obtained a 24% yield of tetrahydrofurfurylamine, B. P. 153–155°/760 mm. and 2% of ditetrahydrofurfurylamine boiling at 145–152°/20 mm.

In place of nickel we may use the second catalyst used in Example 1.

*Example 3*

202 gms. tetrahydrofurfuryl alcohol, 100 gms. anhydrous ammonia and 10 gms. nickel or reduced nickel oxide are heated at 200–205° for 34 hours and the reaction product is worked up as described in Example 1. There is obtained 34% tetrahydrofurfurylamine, 22% di-tetrahydrofurfurylamine and 6.2% tri-tetrahydrofurfurylamine, B. P. 155–157°/2 mm. This compound is a colorless, water-soluble liquid having the constants N$_D$1.4835/25°; calcd. for C$_{15}$H$_{27}$NO$_3$: C, 66.91; H, 10.03; N, 5.20. Found: C, 67.39; H, 10.17; N, 5.40.

In place of nickel we may use a reduced nickel prepared by any process, which may be supported on material such as pumice, charcoal, diatomaceous earth, etc.

*Example 4*

185 gms. ditetrahydrofurfurylamine, 100 gms. tetrahydrofurfuryl alcohol and 5 gms. nickel are heated at 200–230° for 40 hours. The reaction products are fractionated and there is obtained a 20% yield of tritetrahydrofurfurylamine, a small amount of tar and a basic water-insoluble material boiling at 110°/2 mm.

*Example 5*

An aluminum oxide catalyst is prepared as follows: 200 gms. of crystalline aluminum nitrate are dissolved in 2 l. water and 200 gms. infusorial earth are added. Then ammonium hydroxide is added in a slight excess. Wash thoroughly, dry the product at room temperature and pulverize.

The catalyst thus prepared is placed in a Pyrex tube heated to 200–250° and the vapor of tetrahydrofurfuryl alcohol containing the desired molecular ratio of alcohol to ammonia is led over the catalyst at any desired rate. For example, pass 0.8 of a mole of tetrahydrofurfuryl alcohol containing 3 moles of ammonia per hour over 60 gms. of catalyst. The reaction products may be recirculated if di- or tritetrahydrofurfurylamine are desired. On the basis of the alcohol reacted there is obtained a good yield of amines.

Example 6

Finely divided nickel oxide is made into a paste with colloidal silica and the paste is deposited on pumice granules.

20 gms. of the catalyst are heated with 202 gms. of tetrahydrofurfuryl alcohol and 70 gms. of ammonia at 220–230° for 36 hours. The reaction products are worked up as described in Example 1. The yields of primary, secondary, and tertiary amine are 36%, 30%, and 10% respectively. If a higher yield of primary amine is desired, more ammonia is used or secondary amine is added.

This catalyst may be used to react with the alcohol or ammonia in the gas phase as described in Example 5.

Example 7

A catalyst composed of alumina supported on silica gel is prepared as follows: 300 gms. of silica gel are heated at 398–400° under reduced pressure for 4 hours and cooled. Then 135 gms. of aluminum nitrate are dissolved in 650 cc. of water and the silica added. After standing for a few hours the impregnated gel is filtered off and heated at 400°.

The catalyst prepared as described is then placed in a suitable reaction vessel and tetrahydrofurfuryl alcohol in the vapor state containing ammonia (molecular ratio 1:3 or 1:5) is passed over the catalyst heated to 300°. The conversion of alcohol to amine is about 20–25% for a contact time of 1–2 seconds. The relative amounts of amines formed are primary 30%, secondary 20%, tertiary 6%.

Similar results can be obtained if active charcoal is impregnated with aluminum or nickel nitrate and the precipitated hydroxide fused as above.

Example 8

440 gms. β-tetrahydrofurfuryloxyethanol, 130 gms. ammonia and 10 gms. nickel from a nickel alloy were heated in a shaking autoclave at 210–220° for 40 hours. The reaction products were cooled and fractionated to give a 33% yield of β-tetrahydrofurfuryloxyethylamine, B. P. 162–164°/740 mm., 3% di-β-tetrahydrofurfuryloxyethylamine, B. P. 220–225°/19 mm. and a small amount of tri-β-tetrahydrofurfuryloxyethylamine, B. P. 274–279°/18 mm. Most of the furfuryl compound that did not react was recovered.

Example 9

440 gms. β-tetrahydrofurfuryloxyethanol, 120 gms. ammonia and 8 gms. nickel on kieselguhr (J. Amer. Chem. Soc. 54, 661—1932) were heated in an autoclave with vigorous stirring at 200–230° for 24 hours. There was obtained a 25% yield of the monoamine.

Example 10

440 gms. β-tetrahydrofurfuryloxyethanol, 100 gms. ammonia, 5 gms. nickel from a nickel alloy and 5 gms. of a copper-chromium-zinc oxide catalyst were heated in a shaking autoclave at 200–250° for 24 hours. There was obtained a good yield of the monoamine.

Example 11

An aluminum oxide catalyst was prepared as follows: 200 gms. aluminum nitrate was dissolved in 2 liters of water and 200 gms. infusorial earth was added. Then ammonium hydroxide was added in slight excess. The product was washed well, dried at room temperature and pulverized. The catalyst thus prepared may be substituted in the above operations or may be placed in a "Pyrex" tube heated to 200–275° and a mixture of ammonia (3 moles) and β-tetrahydrofurfuryloxyethanol (1 mole) passed through in the gaseous state. The reaction product may be condensed or may be repassed as often as desired. Good yields of the mono-, di-, and tri-amine were obtained.

Referring now to our novel process generically formulated under V and VI which requires the utilization of a compound having the formula:

aryl—carbon chain-furyl which is reacted with a nitro medium such as HONO or HNO₃, these aryl compounds may be prepared in several ways as follows:

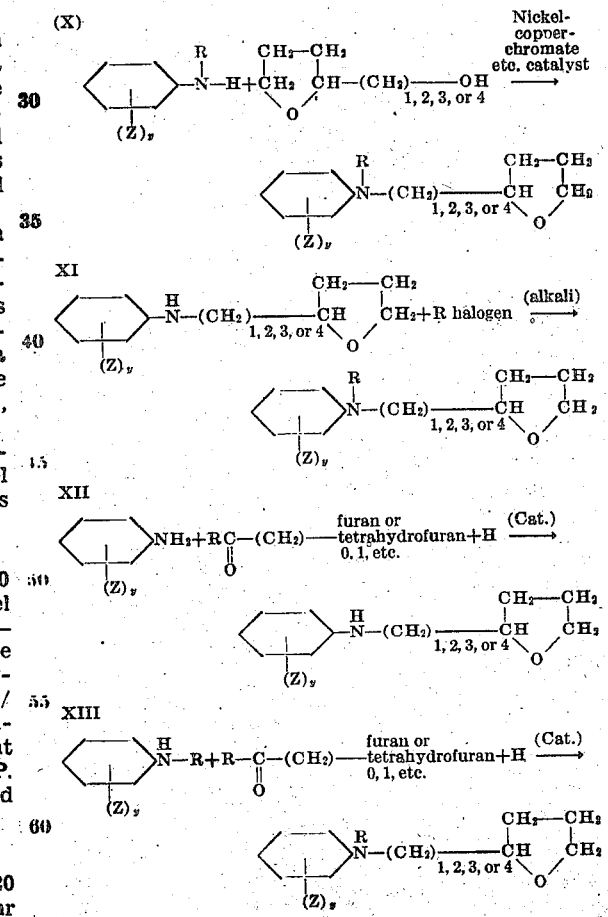

Further details concerning the foregoing Reactions X–XIII can be observed from the following specific examples:

Example 12

200 gms. of aniline, 100 gms. of tetrahydrofurfuryl alcohol, and 5 gms. of nickel on kieselguhr are heated in a shaking autoclave at 210–220° for 30 hours, cooled, removed, and filtered. On distillation there is obtained a good yield of tetrahydrofurfurylaniline boiling at 170–174°/13 mm.

Example 13

200 gms. of m-toluidine, 150 gms. of tetrahydrofurfuryl alcohol, and 10 gms. of nickel are heated in a shaking autoclave for 40 hours at a temperature ranging between 200–250°. On working up as before there is obtained a good yield of tetrahydrofurfuryl-m-toluidine, B. P. 175–180°/14 mm. This on heating with butyl chloride or bromide gave a good yield of butyl-tetrahydrofurfuryl-m-toluidine boiling at 193–195°/22 mm.

Example 14

200 gms. of o-anisidine, 100 gms. of β-tetrahydrofurfuryl ethanol, and 10 gms. of copper chromite are heated as in Example 1. On distillation there is obtained a good yield of β-tetrahydrofurfuryl-o-anisidine, B. P. 186–193°/13 mm.

Example 15

123 gms. of furanacrolein (1 mole), 107 gms. (1 mole) of o-toluidine, and 5 gms. of nickel are heated to 100°. Then hydrogen under a pressure of 1500 lb. is introduced and when 4 moles of hydrogen have been taken up reduction is stopped and there is obtained a good yield of γ-tetrahydrofurylpropyl-o-toluidine boiling at 180–185°/13 mm.

Example 16

One mole of tetrahydrofuryl-m-toluidine is heated in an autoclave at 200° for 8 hours with 1 mole of ethylene oxide. On distillation there is obtained an excellent yield of β-hydroxyethyl-tetrahydrofuryl-m-toluidine boiling at 152–154°/2 mm. In place of ethylene oxide, propylene, trimethylene, tetramethylene, glycidol and the like are used. If in place of one mole of ethylene oxide above we use two or more we obtain β-hydroxy-3-ethoxyethyltetrahydrofurfuryl-m-toluidine. β-hydroxy-3-ethoxy-3-ethoxy-ethyltetrahydrofurfuryl-m-toluidine, and the like may be prepared similarly.

Example 17

3 moles of tetrahydrofurfuryl-m-toluidine are heated at 140° with 3 moles of glycerol chlorohydrin and 2 moles of sodium carbonate. When no more gas is evolved the product is removed from the salt with benzene and distilled. The glyceroltetrahydrofurfuryl-m-toluidine boils at 207–210°/1 mm.

Example 18

One mole of β-tetrahydrofurfurylethyl-o-chloroaniline is heated on a steam bath in alcohol with one mole of chloroacetamide and one of sodium bicarbonate. When no more gas is evolved the salt is separated and the

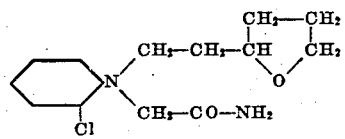

recovered. In place of chloroacetamide we may use chloroacetic acid, ethylchloro acetate, ethylene imine, bromoalkyl sulfonates, sulfonated benzyl chloride, etc.

On referring to the process of IV, the azo starting material of this process may be obtained by procedure as follows:

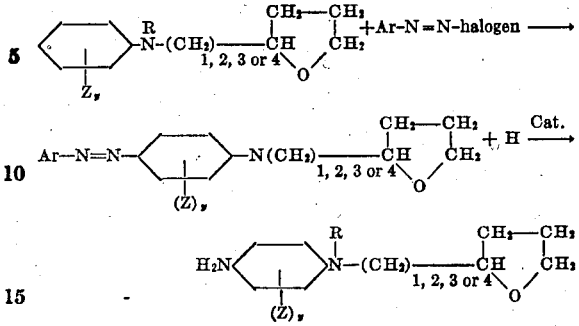

Similarly the compounds may be nitrosated or nitrated and then reduced.

In the foregoing description of processes we have not described the origin of materials such as O₂N aryl-halogen, HONO, and the like, inasmuch as such components are well known commodities. Also, while in the examples we have in many instances indicated the use of a nickel catalyst and would preferably employ a source of nickel obtained from the alloy of nickel with aluminum or silicon, our processes are not restricted to the exact catalyst indicated, but various copper materials such as copper chromite or catalysts such as tungsten, molybdenum or oxides may be employed. When we employ the terms "nickel catalyst," "copper catalyst" and the like herein, we embrace not only the single component catalyst, but catalysts wherein there may be other components exemplified by nickel oxide, chromites, and other oxides or salts of the various catalyst materials herein described.

However, our process is not restricted to the use of catalytic reduction, but it is possible in many instances, particularly wherever there is a furfurylidene linkage, to carry out the reduction electrolytically. The furfurylidene compound would be reduced in an aqueous alcoholic solution of sodium acetate or other comparable materials, acting as a combined electrolyte and solvent. These aqueous components act as an electrolyte and the alcohol as a solvent. A lead cathode would preferably be employed. A relatively high temperature, as for example 15° C. to under 100° C. may be employed. The anode would comprise, for example, cylindrical sheet nickel. Various current densities and potentials may be employed, as for example, 1/100 of an ampere per square centimeter and a potential of around 5 volts. However, other current densities up to, for example, .05 ampere per square centimeter and voltages above 10 volts, may be employed. Or the metals such as zinc, aluminum, tin, cadmium, and mercury may be employed. Also, various compounds may be used as solvents in an electrolyte such as tertiary amines, ammonical ammonium chloride, sulphonates, or even sodium hydroxide may be added to the electrolyte.

The furyl product can be separated by evaporating or distilling off the alcohol which, of course, throws the compound out of solution.

It is believed apparent from the foregoing disclosure with respect to the details of the compounds employed, as to how the preferred phenylenediamine compounds of our invention may be prepared by following the several procedures indicated under I–IX. However, further specific details respecting operation of our processes will be had from the following examples:

Example 19

100 gms. o- or p-phenylenediamine, 20 gms. nickel, and 50 gms. tetrahydrofurfuryl alcohol are heated in a shaking autoclave at 220° for 24 hours; the reaction product is fractionated to give:

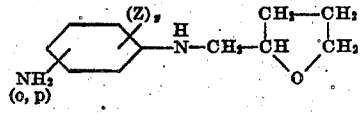

the p-compound boils at 153–156°/1 mm.

Example 20

200 gms. p-nitrophenyl ethylfurfurylamine are charged into an autoclave with 10 gms. copper chromite and hydrogenated at 50–150° under 2–200 atmospheres pressure. When 3 mol. of hydrogen have been absorbed, the reaction is stopped, cooled and distilled.

Example 21

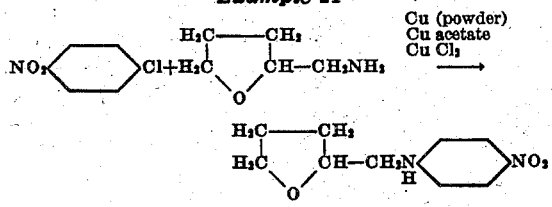

63.0 gms. (0.6 M) tetrahydrofurfurylamine
32.0 gms. (0.2 M) p-nitro-chlorobenzene
17.0 gms. (0.2 M) sodium bicarbonate
Trace of Cu powder, CuCl₂, Cu acetate were charged into a 500 cc. 3-necked flask with 100 cc. of pyridine and heated to reflux for forty hours by means of a direct flame. The reaction mass was cooled to room temperature, filtered, and the filtrate washed with ether. The low boiling solvents such as ether and most of the pyridine were removed by vacuum distillation attaining a temperature of 65° C. at 16 m. m. Weight of residue, 66 gms. The residue was steam distilled to remove traces of unreacted

Sixty gms. of the crude product was dissolved in 200 cc. absolute alcohol and then reduced.

It is apparent from the foregoing that we have provided a number of new compounds containing at least one furyl group in the molecule, together with methods for their preparation, and while these new compounds have a number of uses, we have found, as already indicated, that certain of these compounds are particularly useful for photographic purposes, and the following description respecting the advantages of our compounds for such purposes is not to be considered a derogation of the use of the compounds for other purposes for which they are suitable. Briefly, the method employed for photographic determinations comprises preparing our novel compounds with well known standard developers. That is, roll film was exposed in a certain manner and strips thereof developed in a medium comprising a developer of certain of our new compounds, and in the case of the standard the development comprised a known standard. Inasmuch as the agitation, exposure, and the like conditions were kept the same for the tests the differences observed could be considered as flowing from the use of our compounds being tested. Graininess was determined by microscopic examination at a low degree (approximately 10 x 20X).

The various compounds tested were made up into various formulas. For example, in some formulas 5 gms. of our novel furyl compound was mixed with a substantial amount, as for example 50 gms. of sodium sulfite, together with a substantial content of alkalies or other materials. That is, various other materials, such as sodium carbonate, alkali metal metaborates, and bromide such as potassium bromide may be incorporated. Briefly, some of the results obtained were as follows:

N (4 - amino-3-methylphenyl) - N-tetrahydrofurfuryl glycine-amide

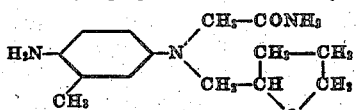

This was a tan powder which, although soluble in hot water, precipitated slowly from solution. The 30-minute developer prepared with caustic soda gave moderately high speeds and graininess, which were cut decidedly by small amounts of bromide. Increasing the activity of the developing solution to 15 minutes did not further increase the graininess.

N-tetrahydrofurfuryl paraphenylenediamine

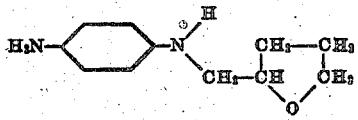

This light gray powder was readily soluble in water and sulfite to produce almost colorless, stable solutions. It was active in sulfite alone and gave high emulsion speed and a warm-toned image of moderate graininess. It was very sensitive to bromide and other silver halide reactants. Progressively increasing activity, obtained with metaborate addition, decreased this sensitivity to bromide.

N-tetrahydrofurfuryl-p-aminophenol sulfate

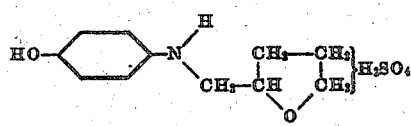

This white powder was quite similar to the p-methyl aminophenol sulfate. It was slightly less active, yielding about the same emulsion speed, fog, and graininess, and possessed a similar sensitivity to addition agents.

2 - amino-5-ethyl - tetrahydrofurfurylamino toluene sulfate

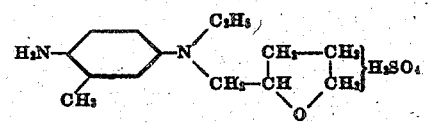

This agent was readily soluble in warm water to give a bright pink solution which became colorless on the addition of sulfite. It was stable for sulfite concentrations up to 15 gms. per liter, but somewhat unstable at 25 gms. per liter. It was active, producing a warm toned image and slightly high fog. The graininess was low in the active developers, and both graininess and fog were cut by bromide. Emulsion speeds, measured by gradient or threshold methods, were high, showing a highly efficient developer.

Therefore, it can be seen from the foregoing that our compounds exhibit desirable properties and that they can be employed in various ways, as for example in various admixtures for photographic purposes. We have found that of our compounds, those having substituents on the aryl nucleus in some instance improve the photographic properties.

It is also apparent from the foregoing that our invention contemplates various modifications of our compounds and various methods of producing the compounds, employing various catalysts, methods of reduction and the like.

What we claim and desire to be secured by Letters Patent of the United States is:

1. A photographic developer which contains, as an essential ingredient, a substantial amount of an amino compound of the following general formula:

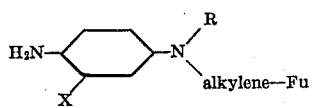

wherein Fu represents a member selected from the group consisting of furyl groups and tetrahydrofuryl groups, R represents a member selected from the group consisting of hydrogen, alkyl groups, hydroxy alkyl groups, alkoxy alkyl groups, cycloalkyl groups, amidoalkyl groups, aryl groups and heterocyclic groups, and X represents a member selected from the group consisting of hydrogen and alkyl groups.

2. A photographic developer which contains, as an essential ingredient, a substantial amount of an amino compound of the following formula:

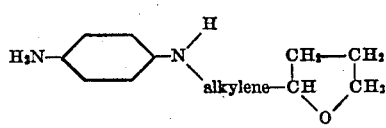

3. A photographic developer which contains, as an essential ingredient, a substantial amount of an amino compound of the following formula:

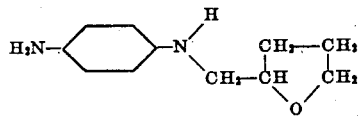

4. A photographic developer which contains, as an essential ingredient, a substantial amount of an amino compound of the following formula:

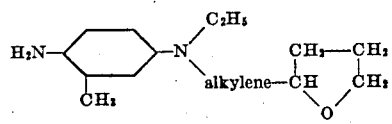

5. A photographic developer which contains, as an essential ingredient, a substantial amount of an amino compound of the following formula:

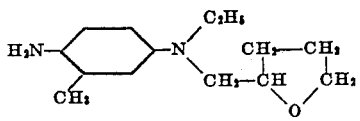

6. A photographic developer which contains, as an essential ingredient, a substantial amount of an amino compound of the following formula:

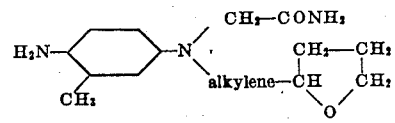

7. A photographic developer which contains, as an essential ingredient, a substantial amount of an amino compound of the following formula:

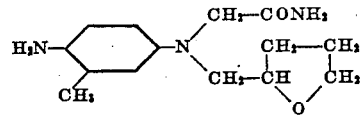

JOSEPH B. DICKEY.
JAMES G. McNALLY.